Figure 1:
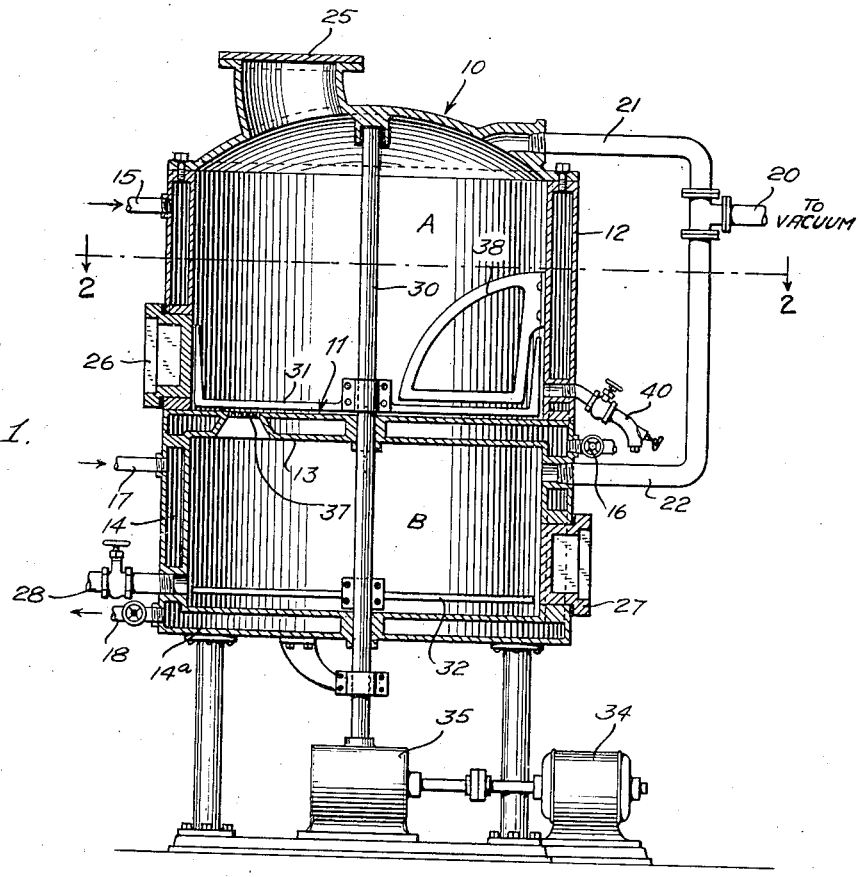

Jan. 18, 1938.  J. P. HARRIS ET AL  2,105,478
METHOD OF RENDERING FAT
Filed Aug. 28, 1934

INVENTORS
JOHN P. HARRIS.
W. ARTHUR WELCH.
BY
ATTORNEY

Patented Jan. 18, 1938

2,105,478

UNITED STATES PATENT OFFICE 2,105,478

METHOD OF RENDERING FAT

John P. Harris, Wilmette, Ill., and William Arthur Welch, Tyrone, Pa., assignors, by mesne assignments, to West Virginia Pulp & Paper Company, New York, N. Y., a corporation of Delaware Application August 28, 1934, Serial No. 741,782

11 Claims. (Cl. 87—13)

Our present invention relates to an improved method of rendering and purifying fat. In the co-pending application of one of us, Harris, Serial No. 627,985, filed August 8, 1932, it has been proposed to carry out the rendering operation in the presence of activated carbon which has been found to produce a much purer and whiter lard and one of increased commercial value.

We have now discovered that even better results are obtained by conducting the process so as to maintain the activated carbon or other treating agent and the residue of the rendering operation (cracklings) separate by removing the fat from the residue as it is freed from the cell tissue and causing it to come immediately and directly into contact with the treating agent. A further improvement consists in bringing the fat as soon as rendered in contact not only with the activated carbon but with a solution of a suitable alkali or alkali salt, as for example sodium carbonate, sodium bicarbonate or sodium hydroxide admixed with the carbon, whereby the free fatty acids present are immediately neutralized and removed from the fat as sodium soap, since the soap is insoluble in the fat, and moreover is found to be adsorbed by the carbon, thereby greatly facilitating its separation. When it has been attempted to do this in one rendering operation as by mixing the unrendered fat with the soda or other neutralizing agent, it is found that the soda is taken up by the glue or other components of the cracklings and a complete neutralization of the free fatty acids does not occur. Under certain circumstances we have found that beneficial results are also had by admixing with the activated carbon any previously rendered fat.

In carrying out our improved process, we prefer to conduct the rendering by the so-called dry method, inasmuch as the excess moisture produced by the wet method interferes with the purifying operation as by carrying down an excess amount of glue or other impurities. Preferably also the rendering process is conducted under a vacuum whereby the moisture is removed as it is released, the temperature being maintained preferably within the range of from 210 to 220° F. approximately. The use of the vacuum is preferred since it greatly decreases opportunity for oxidation and results in a drier product.

In prior methods of rendering heretofore in use it has been the practice to keep the fat when melted in the rendering vessel where it is exposed to the highest temperature therein until the entire rendering operation was complete, this exposure of the fat to the high temperature and to the residue or cracklings making for an inferior product by favoring an increase in the free fatty acid content as well as a darkening of the fat because of the greater opportunity afforded for the taking up of the impurities in the residue by the fat. To the end that the fat may be removed as soon as it is released from the cell tissue, we have devised an improved form of rendering vessel which is divided preferably into an upper rendering compartment proper and a lower purifying compartment, a comparatively small opening (preferably covered by a perforated plate or screen) being provided for the passage of the fat to the lower compartment. A suitable stirring device is provided both in the upper and lower compartments, which suffices to bring the raw fat into contact with the heating surfaces. Also the lower compartment is steam-jacketed to maintain the fat in liquid condition while in contact with the purifying agents. A feature of this apparatus is that not only the side walls of the rendering compartment, but also the floor of this compartment is heat-jacketed, thereby affording a large heating surface for the raw fat being rendered, a portion of which surface is directly beneath the stirring device and surrounds the exit aperture into the treating compartment.

Figure 2:
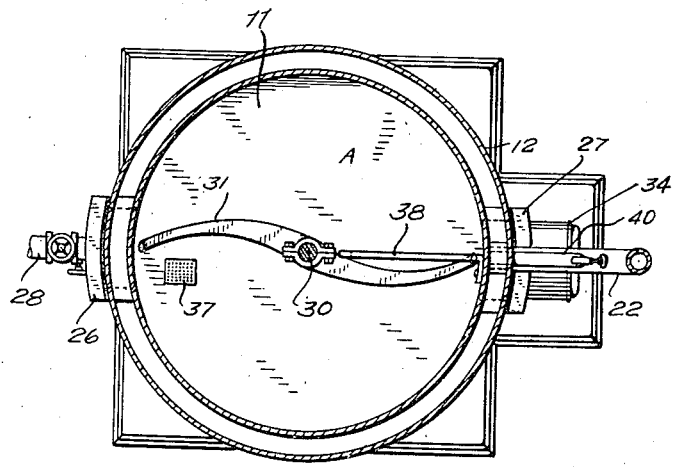

Our invention will be best understood by reference to the following detailed description taken with the annexed drawing, in which Figure 1 is a view, partly in vertical section, of a preferred embodiment of apparatus, while Figure 2 is a view in horizontal section taken along line 2—2 of Figure 1.

Referring to the drawing above mentioned, a rendering vessel, denoted generally by 10, has a partition 11 spaced about one-third of the height of the vessel from the bottom and dividing the vessel into an upper compartment A and a lower compartment B. Compartment A is provided with a heating jacket 12 surrounding the cylindrical wall thereof, and a jacket 13 surrounding the bottom thereof, i. e. below the partition 11, said jackets being in communication with one another. Compartment B is also provided with a heating jacket 14 on the cylindrical wall thereof and a communicating jacket 14a on the bottom thereof. Steam is admitted to jackets 12 and 13 through pipe 15 and leaves through pipe 16. Similarly steam is admitted to jackets 14 and 14a through pipe 17 and leaves through pipe 18. A pipe 20 having a branch 21 leading to the top of the vessel and a branch 22 leading into the lower compartment B leads to a suitable vacuum pump (not shown). The device is further provided with a charging door 25 at the top and a discharge door 26 for the cracklings in the compartment A, and also a clean out door, or manhole 27 in compartment B and a fat draw-off pipe 28. The device is also provided with a stirring apparatus consisting of a central shaft 30 journaled at the top and bottom of the vessel 10 and passing through the partition 11, as shown, there being attached to said shaft a stirring blade 31 in compartment A, and a stirring blade 32 in compartment B. Rotation of this shaft is effected by means of a motor 34 which connects with the shaft through a gear reduction box 35. Partition 11 is provided with an opening for the passage of the liquid fat into the compartment B, such opening being covered preferably by a perforated plate 37. A stationary baffle 38 is also provided in compartment A which cooperates with the stirrer 31 and serves to keep the stirrer free of fat. There is also provided a sampling device 40 to permit the operator to obtain an accurate idea of the condition of the materials in the compartment A while the rendering is taking place.

We now give the following as an illustrative example of the carrying out of our improved process: Steam, preferably superheated, is fed into the jackets of both compartments A and B. Then from 3 to 5% of water and 0.4 to 1.0% of activated carbon, preferably in finely divided form, the percentages being based on the weight of the raw fat, are added to the refining compartment B along with sodium carbonate or other alkali or alkali salt above mentioned in an amount to give a 10% excess of that theoretically necessary to neutralize the free fatty acids. The amount of water chosen is such as to give a dry product at the end of the rendering operation, and this quantity may be varied in accordance with specific operating conditions.

Thirty-five hundred pounds of fat (assuming that to be the capacity of the device) are charged into the rendering compartment through the opening at the top of the rendering compartment, the door 25 thereof sealed, and the vacuum pump (not shown) started. The temperature is maintained by means of the steam jackets in the preferred range of 210 to 220° F. The lard as it is released from the fatty tissue passes by gravity through the perforated plate 37, whereupon it is immediately stirred into the slurry of activated carbon, water and neutralizing agent in the compartment B, the action of the stirrer 32 being to cause a thorough mixing of the fat and treating materials. After about two hours of operation samples are taken through the sampling device 40 in order to determine when the rendering is complete, a state which is denoted be a crisp condition of the cracklings. When the rendering process is complete, the lard is drawn off through the valve 28 and passed through a filter-press (not shown) to remove the activated carbon, and the soaps which have been formed. Also the cracklings are removed through the opening indicated by 26 in compartment A.

By virtue of the fact that the fat is withdrawn from the cracklings as fast as it is formed and immediately purified, no opportunity is afforded for the fat to deteriorate. While it is possible to operate without the use of a vacuum, such use is, however, preferred for the reasons above stated. Furthermore, as above indicated, by neutralizing the free fatty acids in the presence of the activated carbon and in the absence of the crackling, the soaps formed are immediately adsorbed by the carbon, thereby assuring practically complete elimination of both the free fatty acids and the soaps from the fat. It will also be noted that not only can the fat as it is rendered be neutralized, but also any fat previously rendered and containing free fatty acids in solution. Of course, in the latter case some of the benefit of the invention is lost; but provided sufficient neutralizing agent and activated carbon are present, a neutral fat within the limits of free fatty acids given in the following table will be produced.

Typical of the results we have obtained thus far are those set forth in the following table:

*Table*

| Fat used | Color of lard | | F. F. A. | Smoke point | Color of lard after heating to smoke point | |
|---|---|---|---|---|---|---|
| | Yellow | Red | | | Yellow | Red |
| | | | *Percent* | °*F*. | | |
| 3,164 lbs. cold cutting fat<br>265 lbs. beef tallow | 10.0 | 0.7 | 0.05 | 480 | 6.0 | 1.5 |
| Approx. 3,500 lbs. cutting and killing fat | 8.0 | 0.6 | 0.04 | 490 | 2.0 | 0.6 |
| 3,358 lbs. hot fresh fat:<br>10% beef tallow<br>50% gut<br>20% leaf<br>15% faces, ears and tails<br>5% bones | 4.0 | 0.3 | 0.01 | 520 | 2.0 | 0.4 |
| 3,500 lbs. hot killing fat. gut, trimmings, and tallow<br>No leaf | 10.0 | 0.7 | 0.05 | 515 | 3.0 | 0.6 |
| Average kettle rendered lard (for comparison) | 35.0 | 4.0 | 0.30 | 360–400 | Too dark to read accurately. | |

The color values given (Lovibond) were determined according to the official method of the American Oil Chemists Society. "F. F. A." means free fatty acids.

As will be seen, a substantial increase is achieved in the smoke point together with a decrease in the color both before and after heating to the smoke point. Furthermore, the lard produced is drier and possesses a sweeter and more neutral flavor and odor than the ordinary kettle-rendered product. The cracklings produced, moreover, are relatively free from grease, possess their natural golden brown color, and form a valuable by-product.

The activated carbons which we have found most effective are those characterized by a high decolorizing power, preference being had for the type of activated carbon known to the trade as "Nuchar", which is derived from the so-called waste liquor from the soda process of obtaining wood pulp. This liquor contains chemically dissolved or suspended finely divided woody material, and when carbonized by known methods, yields a material of very high adsorptive power. One process for producing this type of activated carbon is described in the patent to Wickenden et al., No. 1,634,478, July 5, 1927, but it will be understood that the invention is not limited to activated carbon produced in this manner.

It will be understood that various modifications of the process and apparatus above described in detail may be made by those skilled in the art without departing from the spirit of our invention or the scope of the appended claims. For example, the rendering tank may be disposed horizontally and the stirrer arranged so as to propel the liquefied material against the perforated partition.

We claim:

1. A fat rendering and refining process which comprises heating the fat bearing materials to free the fat content thereof, draining off the free fat from said materials continuously during the heating, continuously adding the drained fat to an agitated refining agent composed of solid particles as rapidly as the fat drains off from said materials, all steps taking place in a unitary apparatus, whereby at the conclusion of the heating treatment of a charge of said materials, the refined free fat will be separate from the cracklings, and the cracklings and refining agent may be removed separately from one another.

2. A fat rendering and refining process which comprises heating and agitating the fat bearing materials to free the fat content thereof, draining off the free fat from said materials continuously during the heating, continuously adding the drained fat to an agitated refining agent composed of solid particles as rapidly as the fat drains off from said materials, all steps taking place in a unitary apparatus, whereby, at the conclusion of the heating treatment of a charge of said materials, the refined free fat will be separate from the cracklings, and the cracklings and refining agent may be removed separately from one another.

3. A one-stage fat rendering and refining process which comprises heating and continuously agitating a charge of fat bearing materials in one portion of a closed chamber to liberate the fats thereof, continuously draining the free fat liberated from said material, during the heating, into another portion of said chamber and retaining the solids of said material in said one portion of the chamber, immediately and continuously agitating, heating and mixing a finely divided, solid refining agent with said drained fats as they reach said another portion of the chamber, and after all fats have been liberated and drained from said materials, separating the refined fats from the refining agent, whereby, at the completion of the fat liberation from said materials, the refined free fat will be separate from the cracklings, and the refined fat, cracklings and refining agent may be removed from said chamber separately from one another.

4. A one-stage, fat rendering and refining process which comprises heating and continuously agitating a charge of fat bearing materials in one portion of a closed chamber to liberate the fats thereof, continuously draining the free fat liberated from said material, during the heating, into another portion of said chamber and retaining the solids of said materials in said one portion of the chamber, immediately and continuously agitating, heating and mixing a finely divided, solid refining agent with said drained fats as they reach said another portion of the chamber, subjecting both portions of said chamber to a partial vacuum during the heating and mixing operations, and after all fats have been liberated and drained from said materials, separating the refined fats from the refining agent, whereby, at the completion of the fat liberation from said materials, the refined free fat will be separate from the cracklings, and the refined fat, cracklings and refining agent may be removed from said chamber separately from one another.

5. A fat rendering and refining process which comprises heating and agitating the fat bearing materials to free the fat contained therein, draining off the free fat from said materials continuously during the heating, continuously mixing the drained fat with a refining agent comprising activated carbon as rapidly as the fat drains off from said materials, all steps taking place in a unitary apparatus, whereby, at the conclusion of the heating treatment of a charge of said materials, the refined free fat will be separate from the cracklings, and the cracklings and refining agent may be removed separately from one another.

6. The process according to claim 5 in which the refining agent comprises activated carbon and a neutralizing agent in the presence of sufficient moisture to cause ionization of the neutralizing agent.

7. The process according to claim 1 in which the rendering is carried out at a temperature of between 210° and 220° F., approximately.

8. In the treatment of rendered fat containing free fatty acid in solution, the steps of neutralizing same to reduce said free fatty acids to not substantially greater than .05%, which consists in mixing the fat with activated carbon and a neutralizing agent in the presence of sufficient water to cause ionization of said agent, then, when neutralization is completed, separating the purified fat from the activated carbon and the soap that is formed.

9. In the treatment of rendered fat containing free fatty acid in solution, the steps of neutralizing same to reduce said free fatty acids to not substantially greater than .05%, which consists in mixing the fat with activated carbon in an amount approximately 1% of the fat and with a neutralizing agent in the presence of sufficient water to cause ionization of said agent, and then, when neutralization is completed, separating the purified fat from the activated carbon and the soap that is formed.

10. In the treatment of rendered fat containing free fatty acid in solution, the steps of neutralizing same to reduce said free fatty acids to not substantially greater than .05%, which consists in mixing the fat with activated carbon and a neutralizing agent in the presence of sufficient water to cause ionization of said agent, continuing the mixing under vacuum until the reaction is completed, and then separating the purified fat from the activated carbon and soap that is formed.

11. In the treatment of rendered fat containing free fatty acid in solution, the steps of neutralizing same to reduce said free fatty acids to not substantially greater than .05%, which consists in mixing the fat with activated carbon and a neutralizing agent in the presence of sufficient water in the neighborhood of from 3% to 5%, based on the weight of the fat, to cause ionization of said agent, and then, when neutralization is completed, separating the purified fat from the activated carbon and the soap that is formed.

JOHN P. HARRIS.
W. ARTHUR WELCH.